Sept. 27, 1960 E. E. PENTECOST ET AL 2,954,532

SATURABLE REACTOR TIMED MULTIVIBRATOR

Filed Aug. 8, 1956 2 Sheets-Sheet 1

INVENTOR.
EUGENE E. PENTECOST
WILLIAM F. DE BOICE
BY
Harold J. Downes
ATTORNEY

Sept. 27, 1960 E. E. PENTECOST ET AL 2,954,532

SATURABLE REACTOR TIMED MULTIVIBRATOR

Filed Aug. 8, 1956 2 Sheets-Sheet 2

INVENTOR.
EUGENE E. PENTECOST
WILLIAM F. DE BOICE

BY Harold J. Downes

ATTORNEY

United States Patent Office 2,954,532

Patented Sept. 27, 1960

2,954,532

SATURABLE REACTOR TIMED MULTIVIBRATOR

Eugene E. Pentecost and William F. De Boice, Long Beach, Calif., assignors to North American Aviation, Inc.

Filed Aug. 8, 1956, Ser. No. 602,789

6 Claims. (Cl. 331—144)

This invention relates to multivibrators and particularly to a multivibrator utilizing a saturable reactor as the timing element.

Either vacuum tubes or transistors may be used in this circuit depending on the particular application requirements.

A multivibrator is an electronic oscillator whose operation and frequency may either be controlled by its own internal circuitry and is therefore called "free running" or may be controlled by an external trigger source.

Although it may be externally synchronized, the device of this invention exhibits its greatest advantages when operated under free running conditions, especially where frequency stability requirements are critical. In normal resistor capacitor multivibrators, frequency stability is critically dependent on resistor and capacitor values as well as vacuum tube or transistor conduction characteristics. As all of these values vary with temperature, it is difficult to maintain extreme frequency stability. This problem is most accentuated where transistors are used due to their particular temperature instability. The device of the invention includes a saturable reactor as a timing element in place of resistance capacitance circuits. For best results a reactor with a core material with a nearly rectangular hysteresis loop is recommended. The volt-second timing characteristics of such a saturable reactor are relatively indepedent of temperature experimentation indicating a variation of only about 3 percent from 60° to 180° F.

In this invention, multivibrator frequency is almost entirely dependent on the timing characteristics of the saturable reactor and supply voltages. There is relatively little dependence on vacuum tube or transistor characteristics or circuit resistance elements. This makes stability primarily dependent on well-regulated power sources which are readily obtainable as compared with temperature stabilized resistance and capacitance elements.

The use of this invention is particularly advantageous where a low frequency of oscillation is desired. At such frequencies, resistance-capacitance multivibrators require either bulky paper type or unstable electrolytic capacitors. A saturable reactor for operation at such frequencies need be little larger than capacitors used in high frequency multivibrators. Such space saving considerations are of great importance in modern electronic equipment, especially in airborne applications.

The invention herein described provides a more stable multivibrator and one which particularly lends itself to compact design for low frequency operation.

It is an object therefore of this invention to provide an improved multivibrator.

It is another object of this invention to provide a multivibrator more stable in operation under varying temperature conditions.

It is a further object of this invention to provide a multivibrator whose frequency characteristics will be less liable to change over long periods of operation.

It is a still further object of this invention to provide a multivibrator for low frequency operation capable of more compact construction.

Other objects of invention will become apparent from the following description taken in connection with the accompanying drawings in which.

Figure 3:
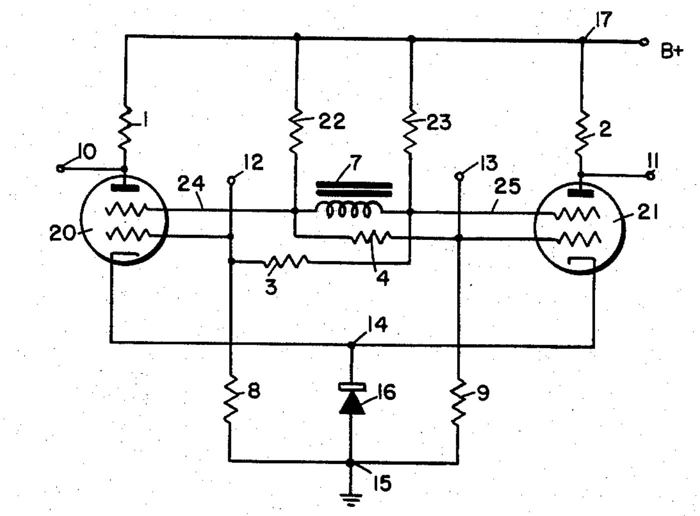

And Fig. 3 is a schematic of the device of the invention employing vacuum tubes utilizing screen grids in the control circuitry.

Figure 1:
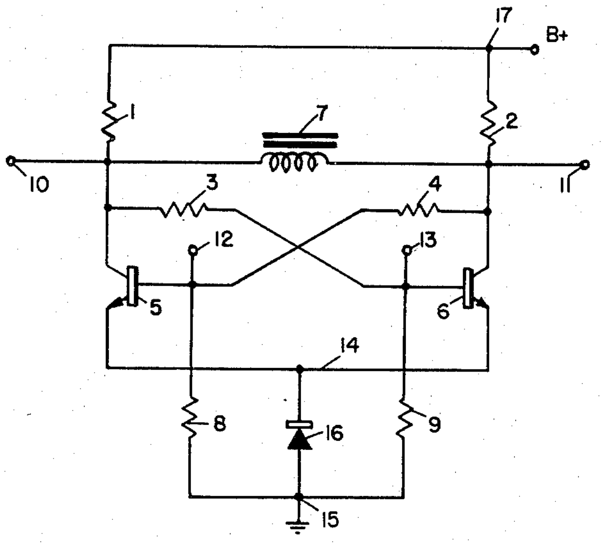
Fig. 1 is a schematic of the device of the invention employing transistors.

Referring to Fig. 1, the multivibrator is composed of transistors 5 and 6, the emitters of which are connected to the cathode of a zener diode 16 whose anode is connected to ground. A zener diode is a specially designed device which maintains a precise back breakdown voltage. The collector of each transistor is connected through a respective resistor 1 and 2 to a B+ supply. A saturable reactor 7 is connected between the transistor collectors. Resistors 3 and 4, respectively, connect each transistor collector to the base of the other transistor. The base of each transistor is respectively connected through resistors 8 and 9 to ground. The above configuration applies where transistors 1 and 2 are of the NPN type. In an NPN transistor, conventional current flow is from collector to emitter. In PNP transistors conventional current flow is from emitter to collector. Consequently, if PNP transistors were used, the power connections would have to be reversed, with B+ connected to point 15 and point 17 connected to ground. Connections to zener diode 16 would have to be reversed also so its cathode would be connected to point 15. All other connections would remain the same. The transistors function in the multivibrator circuit as switching devices which are alternately conductive and cut off. The emitter and collector act as switching terminals for the circuit, while the base acts as a control terminal for controlling conduction and cut off.

Figure 2:
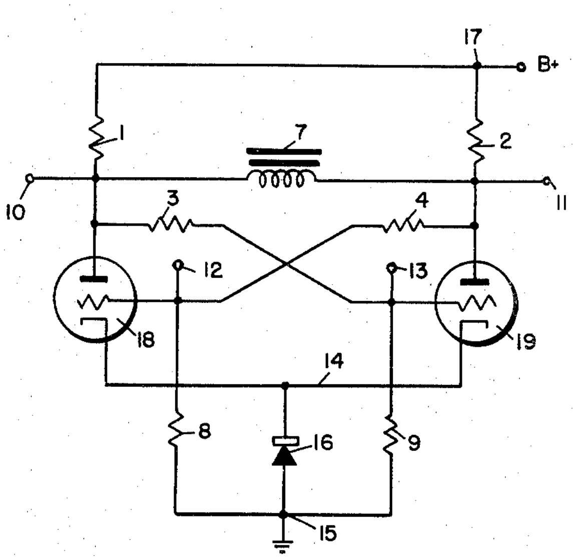
Fig. 2 is a schematic of the device of the invention employing vacuum tubes.

Referring to Fig. 2, the multivibrator is composed of vacuum tubes 18 and 19. The circuitry is otherwise as described for transistors (for the case of NPN type), the vacuum tube plates act as switching terminals corresponding to transistor collectors, the cathodes act as second switching terminals corresponding to emitters and the grids act as control terminals corresponding to bases.

Referring to Fig. 3, the multivibrator employs tetrode vacuum tubes 20 and 21. Pentodes could be similarly used. Circuitry and operation is the same as described above except as follows: (1) saturable reactor 7 is connected between the screen grids of tubes 20 and 21 rather than between the plates; (2) power is fed from B+ to each screen grid through a respective resistor 22 and 23; and (3) the screen grids rather than the plates are coupled through resistors 3 and 4, respectively, to the grids of the opposite tubes. This adaptation is particularly useful where power output is desired as it enables isolation of the load from the frequency determining circuitry.

Let us assume free running operation of this device. If the first transistor 5 is conducting, then the potential at the collector, point 10, will approach that at emitter point 14, the internal resistance of a transistor being relatively low during conduction. The second transistor will be held cut off by the potential fed to its base from point 10 through resistor 3, as this potential is somewhat less than the voltage on the emitter of the second transistor 6, as determined by the voltage divider composed of the resistors 3 and 9 to ground. Transistor emitter voltage is fixed by voltage reference, zener diode 16. The zener diode establishes a precise bias voltage on the emitters which tends to stabilize the frequency of operation of the multivibrator. With the second transistor cut off, the potential at its collector, point 11, approaches that of B+. The potential at point 10, as previously mentioned, approaches that of the voltage reference source at point 14. This potential difference between points 11 and 10 is across saturable reactor 7. Due to the high inductive reactance of this reactor there will be little current flow through it initially. However, after a certain amount of time which is dependent on the potential applied to the reactor and its volt-second characteristics, the reactor core will reach saturation and the impedance will suddenly drop to a value equal approximately to the D.-C. resistance of its windings. This will initiate a sudden rise in current through the saturable reactor resulting in a voltage drop across resistor 2 which will appear at point 11. As the conduction path for the reactor is through the first transistor, the voltage at point 11 will approach that of the reference source at point 14. This voltage will be reflected as a cut off bias at the base of the first transistor, point 12, as determined by the voltage divider formed by resistors 4 and 8 to ground. The first transistor consequently will be cut off, and the voltage on its collector at point 10 will rise to approximately the B+ value. This voltage rise will be reflected through resistor 3 to the base of the second transistor and cause it to start conducting. This completes one half cycle of operation. The process will now start again with the second transistor conducting and conduction through the saturable reactor in the opposite direction. Such conduction will continue until the reactor's saturation point is again reached, at which time we will again have a reversal of conduction. The frequency of oscillation is determined by the time it takes for the saturable reactor to reach its saturation point. This is a function of the voltage applied to the reactor and the saturation characteristics of the particular reactor used. Output signal may be taken from the collector of either transistor, points 10 or 11 and ground, or from the base of either transistor, points 12 or 13.

The circuit of this device as described can be externally synchronized and utilized for any of the normal functions of a free running multivibrator such as frequency division or precise synchronization with a trigger pulse. Synchronization pulses can be fed to the base of either transistor and can be either negative or positive in polarity. Where precise synchronization is desired, it is necessary that the multivibrator be designed to free run at a frequency slightly below the synchronizing frequency.

Typical circuit values for Fig. 1 are as follows:

A. Resistors:

| | |
|---|---|
| **1** | 10K |
| **2** | 10K |
| **3** | 50K |
| **4** | 50K |
| **8** | 150K |
| **9** | 150K |

B. Transistors 5 and 6 are standard types such as type 904A.

C. Zener diode 16 is in this particular design type IN201, but type will vary with individual design considerations.

D. Saturable reactor 7 is wound on a saturable core made of a 50% nickel and 50% iron alloy, the number of windings being calculated for the frequency of operation desired.

E. The B+ D.-C. source is 55 volts.

Although this invention has been described and illustrated in detail, it is to be clearly understood that the same is by way of illustration and example only and is not to be taken by way of limitation, the spirit and scope of this invention being limited only by the terms of the appended claims.

We claim:

1. In a multivibrator circuit, a D.-C. power source, a first and second transistor, said transistors having at least a collector, emitter and a base, a saturable reactor connected from the collector of said first transistor to the collector of said second transistor, a first resistor connected from said D.-C. power source to the collector of said first transistor, a second resistor connected from said D.-C. power source to the collector of said second transistor, a third resistor connected from the collector of said first transistor to the base of said second transistor, a fourth resistor connected from the collector of said second transistor to the base of said first transistor, a fifth resistor connected from the base of said first transistor to the negative terminal of said D.-C. power source, a sixth resistor connected from the base of said second transistor to the negative terminal of said D.-C. power source, a voltage reference source, the emitter of said first transistor connected to the emitter of said second transistor and this connected to said voltage reference source.

2. In a multivibrator circuit a first and second vacuum tube, said vacuum tubes having at least an anode, cathode and grid, a saturable reactor connected from the anode of said first vacuum tube to the anode of said second vacuum tube, a D.-C. power source, a first resistor connected from said D.-C. power source to the anode of said first vacuum tube, a second resistor connected from said D.-C. power source to the anode of said second vacuum tube, a third resistor connected from the anode of said first vacuum tube to the grid of said second vacuum tube, a fourth resistor connected from the anode of said second vacuum tube to the grid of said first vacuum tube, a fifth resistor connected from the grid of said first vacuum tube to the negative terminal of said D.-C. power source, a sixth resistor connected from the grid of said second vacuum tube to the negative terminal of said D.-C. power source, a D.-C. reference source, the cathode of said first vacuum tube connected to the cathode of said second vacuum tube and this connected to said D.-C. reference source.

3. In a multivibrator circuit a first and second vacuum tube, said vacuum tubes having at least an anode, cathode, control grid and screen grid, a saturable reactor connected from the screen grid of said first vacuum tube to the screen grid of said second vacuum tube, a D.-C. power source, a first resistor connected from said D.-C. power source to the screen grid of said first vacuum tube, a second resistor connected from said D.-C. power source to the screen grid of said second vacuum tube, a third resistor connected from said D.-C. power source to the anode of said first vacuum tube, a fourth resistor connected from said D.-C. power source to the anode of said second vacuum tube, a fifth resistor connected from the screen grid of said first vacuum tube to the control grid of said second vacuum tube, a sixth resistor connected from the screen grid of said second vacuum tube to the control grid of said first vacuum tube, a seventh resistor connected from the control grid of said first vacuum tube to the negative terminal of said D.-C. power source, an eighth resistor connected from the control grid of said second vacuum tube to the negative terminal of said D.-C. power source, a D.-C. reference source, the cathode of said first vacuum tube connected to the cathode of said second vacuum tube and this connected to said D.-C. reference source.

4. In a multivibrator, a first and second electronic active element switching device, said switching devices each comprising at least an electron emitting electrode, an electron collecting electrode and a control electrode, a power source connected in circuit with each of said switching devices, a first impedance connected intermediate said electron collecting electrode of said first switching device and said power source, a second impedance connected intermediate said electron collecting electrode of said second switching device and said power source, a saturable inductive reactor connected between the electron collecting electrode of said first and second switching devices, a third impedance coupling said electron collecting electrode of said first switching device to the control electrode of said second switching device, a fourth impedance coupling said electron collecting electrode of said second switching device to the control electrode of said first switching device, and a voltage reference source, the electron emitting electrodes of said first and second switching devices being connected together, this common connection being connected to said voltage reference source.

5. In a multivibrator, a first and second electronic active element switching device, said switching devices each comprising at least electron emitting, electron collecting and control electrodes, a direct current power source, a first impedance connected intermediate said power source and one of said electron emitting and electron collecting electrodes of said first switching device, a second impedance connected intermediate said power source and one of said electron emitting and electron collecting electrodes of said second switching device, said one electrode of said first switching device corresponding to said one electrode of said second switching device, a bias reference source, the other of said electron emitting and electron collecting electrodes of said switching devices being connected to one side of said reference source, a saturable inductive reactor connected intermediate said one of said electrodes of said first switching device and said one of said electrodes of said second switching device, a third impedance coupling said one of said electrodes of said first switching device and said control electrode of said second switching device, and a fourth impedance coupling said one of said electrodes of said second switching device and said control electrode of said first switching device.

6. In a multivibrator, first and second active element switching devices, each of said switching devices having at least an electron collecting electrode, an electron emitting electrode and a control electrode, a saturable inductive reactor connected between said electron collecting electrode of said first switching device and said electron collecting electrode of said second switching device, a D.-C. power source, first and second impedance elements separately connected between said power source and said collecting electrodes of said first and second switching devices, respectively, a third impedance element connected between said electron collecting electrode of said first switching device and said control electrode of said second switching device, a fourth impedance element connected between said electron collecting electrode of said second switching device and said control electrode of said first switching device, a voltage reference source, the emitting electrodes of said switching devices being connected together and to said reference source, fifth and sixth impedance elements separately connected between the negative terminal of said D.-C. power source and the control electrodes of said first and second switching devices, respectively.

References Cited in the file of this patent

UNITED STATES PATENTS

| | | |
|---|---|---|
| 2,055,208 | Rumpel | Sept. 22, 1936 |
| 2,665,845 | Trent | Jan. 12, 1954 |
| 2,722,602 | Pawley | Nov. 1, 1955 |
| 2,740,086 | Evans et al. | Mar. 27, 1956 |
| 2,750,502 | Gray | June 12, 1956 |
| 2,759,104 | Skellet | Aug. 14, 1956 |
| 2,770,734 | Reek | Nov. 13, 1956 |
| 2,838,675 | Wanlass | June 10, 1958 |